United States Patent Office 3,184,476
Patented May 18, 1965

3,184,476
PROCESS FOR REMOVING ENDOGENOUS ACTIVATORS FROM PYRROLIDONE
Harold T. Wingfield, White Bear Lake, and Benji Oiye, West St. Paul, Minn., assignors to Minnesota Mining and Manufacturing Company, St. Paul, Minn., a corporation of Delaware
No Drawing. Filed Sept. 5, 1961, Ser. No. 136,409
2 Claims. (Cl. 260—326.5)

This invention relates to the purification of pyrrolidone and more particularly to a method for the production of pyrrolidone adapted for polymerization with close control of activator concentration.

It is known that the alkali-catalyzed polymerization of 2-pyrrolidone (also sometimes called pyrrolidinone) leads to linear polymers, termed generically polypyrrolidone, possessing desirable properties and consisting substantially of recurring units having the structure:

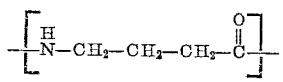

These polymers are believed to be terminated at the carbonyl end by a pyrrolidyl radical and at the other end by an initiator radical which depends upon the particular activator employed in the reaction. Each molecule of activator added to or present in the polymerization reaction appears to, or theoretically at least potentially can lead to the formation of a molecule of polymer. It is thus evident that the total activator concentration has an approximately inverse relationship to the ultimate average molecular weight of the polymer which is obtained from the reaction. Hypothetically a single activator molecule might result in a polymer of almost infinite molecular weight. Practically, in order to obtain polymer of high molecular weight, it is necessary to achieve careful control of the concentration and species of activator present in the reaction mixture. This control must be held to very close tolerances in order to achieve desirably high molecular weights of polymer. The species of the activator molecules present are also significant with respect to the course of the reaction, molecular weight distribution in the polymer, and probably the stability of the polymer. Pyrrolidone made by the reaction of butyrolactone with ammonia ordinarily contains small amounts of butyrolactone, which is an activator, as well as other endogenous substances. In order to control the species it is desirable that only the selected and added activator be present and endogenous activators be eliminated as nearly as possible.

When excessive amounts of endogenous activator are present polymerization of the monomer proceeds to an appreciable extent, e.g. 15% conversion or more in about 4 days on addition of a catalytic amount e.g. about 3–4 weight percent, of sodium pyrrolidone, without addition of activator. Such a monomer will lead to runaway polymerizations when activators are added in normal amounts. By a runaway polymerization is meant an activated polymerization which proceeds at a rate which is faster than that which is consistent with the amount of added activator. It will be apparent that the precise amount of activator added will determine the rate in a particular instance and that the rate must be measured over a period early enough in the process so that the normal slowing down or deceleration of reaction toward the end of the polymerization is not included. These rates are found to be a complex function of the particular activator, concentrations, temperature and times. It is found that a quantity which may be termed the "monomer number" (sometimes herein referred to as "m.n.") is a more convenient measure of freedom of monomer from endogenous activators.

Where C is the percent conversion and $<\eta>$ the inherent viscosity of the polymer formed from the monomer in the presence of about 3–4% of sodium pyrrolidone, the monomer number is defined as $$m.n. = \log\left[\frac{100<\eta>}{C}\right]$$

This number is apparently independent of time, temperature and is not much affected by other minor variations provided the monomer is maintained anhydrous. The number is apparently always a positive number. Desirable monomer possesses values above 1 and up to about 2. Undesirable monomer has values usually very much below 1, e.g. of the order of 0.6 to 0.8.

So far as is known, all presently commercially available pyrrolidone is made by a process which includes the reaction of butyrolactone with ammonia. Such pyrrolidone contains various impurities, viz. inhibitors, activators and inert materials. Typical of the inhibitors are such relatively volatile, active hydrogen atom-containing materials as ammonia, pyrrole and water. Tetrahydrofuran is an inert material which may be present. It has heretofore been assumed that butyrolactone is the only significant endogenous activator present as an impurity and procedures have been described for the removal of that material. The materials present other than the monomer, which arise from the process for production of the 2-pyrrolidone or which are present as impurities derived from or present in intermediates used in the process, are designated herein as endogenous substances.

As examples of jurification procedures, reference is made to Lohr U.S. Patent 2,802,777 wherein is described crystallization of pyrrolidone as the hydrate followed by drying, as by azeotropic distillation and distillation in vacuo, and Robinson U.S. Patent 2,806,856, disclosing the successive distillation of pyrrolidone from an acid anhydride and a base. These processes will substantially remove the inhibitors, inerts and lactone. Also, fractionation using at least seven theoretical plates will accomplish this end.

So far as is known, it has not heretofore been realized that these processes fail to remove all endogenous activators.

It has now been found that a heretofore unknown weakly basic endogenous activator is present in pyrrolidone as synthesized, or can be formed in pyrrolidone as a result of inter-molecular dehydration, even under such mild conditions as somewhat prolonged heating during distillation of anhydrous pyrrolidone. Ordinarily this material is present in amounts of the order of 0.1 to 0.3 mole percent, an amount so small that it has been overlooked. The amount of this endogenous activator which is present can be determined by potentiometric titration, using standardized acid and plotting the course of the titration. The volume consumed in passing the inflection point at a pH of 4.8 is determined.

The weakly basic endogenous activator which is found as an impurity in pyrrolidone has been identified as the compound which is represented by the structural formula:

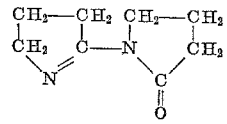

and which can be named systematically as 1-(1-pyrrolin-2-yl)-2-pyrrolidinone. This substance is hereinafter sometimes for convenience referred to as pyrrolinyl-pyrrolidone.

Pyrrolinyl-pyrrolidone is very soluble in pyrrolidone and has physical properties which are quite similar to those of pyrrolidone. It apparently cannot be removed by fractional distillation, and differential solubilities between this substance and the monomer are very slight. Furthermore, attempts at fractionation, which necessarily involve prolonged heating since best efficiency is obtained at highest reflux ratio, produce more of this activating impurity.

The presence of the endogenous activators collectively has undesirable results in polymerization of pyrrolidone as hereinelsewhere described.

It is an object of this invention to provide a method for purifying pyrrolidone. Another object of the invention is to provide a method for controlling the concentration of pyrrolinyl-pyrrolidone in pyrrolidone containing that impurity. Another object of the invention is to provide pyrrolidone which is substantially free from endogenous activators particularly pyrrolinyl-pyrrolidone. Other objects will become evident hereinafter.

In accordance with the above-named and other objects of the invention it has been found that the pyrrolinyl-pyrrolidone which is present in pyrrolidone is readily hydrolyzed by water at temperatures in the range from about 80° C. up to the boiling point of pyrrolidone, and is thereby reconverted to pyrrolidone monomer. This is surprising, because this impurity is, formally speaking, the amide of a secondary amine and as such would be expected to be hydrolysis-resistant. The reaction is catalyzed by slight acidification of the water-containing reaction mixture, as by the addition of small amounts of acids, including mineral acids, such as perchloric, hydrochloric and sulfuric acids, or organic acids such as trichloracetic acid and the like.

Since neutral anyhdrous pyrrolidone is converted to pyrrolinyl-pyrrolidone when heated at temperatures above about 100° C., the reaction is an equilibrium reaction which tends toward pyrrolidone under conditions of heating in the presence of water and toward pyrrolinyl-pyrrolidone under anhydrous and dehydrating conditions.

Pyrrolidone heretofore produced by various methods has apparently always contained a significant amount of pyrrolinyl-pyrrolidone. The removal of water from pyrrolidone in preparing it for polymerization by distillation imposes dehydrating conditions even though these are relatively mild. Even distillation in vacuo effectively provides dehydrating conditions when the dwell time of the pyrrolidone at elevated temperatures is prolonged. In the synthesis and purification procedures heretofore used it has been usual to distil the pyrrolidone, thereby forming an unpredictable amount of pyrrolinyl-pyrrolidone; which, in later procedures, serves, together with deliberately added activator, to activate the polymerization reaction and results as hereinabove noted in runaway polymerizations. It has not heretofore been known that the heating involved in distillation has progressively more deleterious results as the period of heating is prolonged. Because it is desirable to limit the amount of activator carefully in order to obtain high molecular weight, the result is that even the most highly purified monomer heretofore known yielded lower molecular weight polypyrrolidone having a broader spectrum of molecular weight distribution than expected since the presence and etiology of this impurity was not suspected.

The control of the amount of activator added to the polymerization mixture and the molecular weight distribution pattern is found to be related in a rather complex manner with the ultimate properties of a fiber formed by extrusion from polypyrrolidone. To some extent this is the result of the large number of variables which can be recognized as determining the properties of the polymer at various stages. It will be evident that in general, the duration of heating of pyrrolidone in production and purification will generally be increased as larger quantities are employed. Thus, the problems involved in purification and other procedures are significantly multiplied when batches of the order of hundreds of kilograms are used. In order to obtain consistent and reliable results in actual production, the control of the amounts of activating impurities is very important for all subsequent steps in the formation of fibers of polypyrrolidone.

So far as can be determined, all of the impurities in commercially available pyrrolidone are present initially. Pyrrolidone employed in the preparation of vinyl-pyrrolidone may contain inhibitors from earlier synthetic steps in amounts sufficient to prevent spontaneous polymerization in the presence of alkali and still be useful, but for polymerization purposes, higher standards of purity must be set.

Substantially all impurities other than pyrrolinyl-pyrrolidone can be removed by careful fractional distillation, but in this process more pyrrolinyl-pyrrolidone is formed and codistils with the pyrrolidone. The amount varies depending upon the heating time, etc. as aforesaid, and accordingly the concentration of this substance which may be present is unpredictable.

In accordance with the objects of the invention, the present invention provides a method for removing pyrrolinyl-pyrrolidone from 2-pyrrolidone, and thus provides 2-pyrrolidone substantially free from pyrrolinyl-pyrrolidone. In another aspect, the invention can be considered to provide 2-pyrrolidone which is substantially free from endogenous activators.

As a starting material for the process of the invention, it is desirable to employ pyrrolidone from which endogenous activators other than pyrrolinyl-pyrrolidone have been removed. This condition is most conveniently achieved by fractional distillation through at least seven theoretical plates. Because of the high boiling point of pyrrolidone this fractionation is preferably effected under somewhat reduced pressure. Beside substantially eliminating the endogenous activators as noted, this same distillation procedure will also effectively remove other substances such as inhibitors and inerts. The resultant monomer preferably should contain no more than about 0.04 to 0.05 weight percent of butyrolactone and neutral endogenous activators other than pyrrolinyl-pyrrolidone, as determined, for example, by vapor phase chromatography.

Water is then added to the monomer in the selected amount. While it is recognized that the stoichiometric equivalent of water, or a slight excess, relative to the pyrrolinyl-pyrrolidone, will eventually bring about the hydrolysis, the rate of the reaction is extremely slow and as a practical matter a larger excess of water will accelerate the reaction. It is found that the amount of water employed may vary over wide extremes. Less than 3 percent of water by weight requires an excessively long period for hydrolysis to proceed to substantial completion, but any amount upwards of this is suitable. It will be recognized that very large amounts are undesirable since an excessive time is then required for removal thereof subsequent to hydrolysis and before polymerization. In general, amounts above 25 percent by weight may be considered practically excessive although by no means inoperative. The preferred range is from about 3% to 10% by weight; while, an amount of about 5% to 8% is particularly desirable since it provides the most satisfactory balance between the increased rate of hydrolysis and the subsequent time required for removal of the excess of water.

As stated above, the hydrolysis may be effected merely by heating with water. It is found that increasing the concentration of hydrogen ions present also accelerates the hydrolysis. An effective amount of acid may be only that which is sufficient to produce a 0.005 N solution (approximately 0.25 g. of $H_2SO_4$ per liter), but may be higher for even more rapid hydrolysis. In general, concentrations of acid up to about 0.1 N are useful. Above that, no appreciably additional benefits accrue and at very high values, e.g. 2 N to 3 N, side effects result in disadvantages, such as tar formation, etc.

The temperature for the hydrolysis is, of course, inversely related to the time. Reaction periods of the order of several weeks are normally undesirable, although it is contemplated that the hydrolysis might be carried out during storage of the monomer in which case relatively very long reaction periods would nevertheless be useful. However, it is apparent that there is a cost factor in storage involving capital investment such that periods of more than about 1 to 2 weeks are ordinarily not practical. In general, a preferred range of reaction time is from about ¼ to about 16 hours. The shorter times are employed when sufficient water and some acid are present and higher temperatures are used. Lower temperatures, lower concentrations of water and neutral conditions will require longer times. Temperatures in the range of about 80° to 200° C. are useful. At higher temperatures with higher concentrations, pressure is necessary to prevent loss of water by boiling of the mixture. The preferred temperature range is from about 130° to 170° C.

Hydrolysis of the pyrrolinyl-pyrrolidone is effected by heating the pyrrolidone containing water as above described for the necessary period of time. Completion of the hydrolysis may be determined, for example, by titration of a sample with standard hydrochloric acid (after neutralizing any sulfuric acid present, suitably with a barium carbonate, followed by filtration from the precipitate). When hydrolysis has proceeded to the point where pyrrolinyl-pyrrolidone has been substantially completely removed, as, for example, when there remains less than about 0.07 percent by weight of pyrrolinyl-pyrrolidone as determined by titration, the reaction may be terminated by removal of the water. Pyrrolidone purified to this extent after removal of inhibitors and other endogenous activators as described hereinbefore has a monomer number above 1.0 and is useful for controlled polymerizations. The pyrrolidone may first be treated with a base, e.g. lime, to neutralize any acid employed and is then ready for drying; alternatively, the monomer may be dried without neutralization. The excess of water may be removed by distillation of a forerun or more conveniently by azeotropic distillation of the water, for example, with xylene. If deeply colored, the residue of dry pyrrolidone which is substantially free from endogenous activators is decolorized as by rapid distillation under reduced pressure.

It must be realized that heating can result in reformation of pyrrolinyl-pyrrolidone and it is preferred that during distillation of hydrolytically-treated monomer the pyrrolidone is not maintained at a temperature above about 120° C. for more than about one hour. At higher temperatures even shorter dwell times and very rapid distillation is necessary. Lower temperatures require lower pressures but permit of somewhat longer heating. Continuous fractionation, as is well known in the art, is especially useful in rapid distillation and is preferred for the purposes of the invention where large quantities of material are being handled.

Decolorization of monomeric pyrrolidone can also be effected by use of known decolorants such as adsorptive carbon and the like. If a slight discoloration of the pyrrolidone is not objectionable, the decolorization step may be omitted.

Anhydrous pyrrolidone which is substantially free from endogenous activators is preeminently suited for polymerization. If desired, it can be stored, provided adequate safeguards are maintained to prevent contamination either with water or activators. For purposes of polymerization to high molecular weight it is only necessary to add the required and carefully controlled amounts of activator and a basic catalyst, e.g. sodium pyrrolidone, and then permit the reaction mixture to stand out of contact with moisture for the necessary time.

When extremely accurately predetermined amounts of activator are to be employed, the presence of minute residual amounts of endogenous activator must be taken into consideration, especially when the activator concentrations used are low. A convenient way to determine the significance of these minute residual amounts of endogenous activator for the polymerization when low concentrations of activator are employed a series of test polymerization runs are made employing known added amounts of activator. For example, if it is desired to employ 0.20 mole percent of activator and it is known that not more than about 0.07 mole percent of endogenous activator is present in the monomer, small lots are prepared in which 0.13, 0.17 and 0.20 mole percent of the desired activator are employed. The three lots are permitted to polymerize at the selected temperature for a suitable time and worked up in the usual manner. Determination of the inherent viscosity in conjunction with the conversion and, if necessary, interpolation on a graphical display of the results obtained, will indicate clearly the precise amount of activator needed to provide polymer having the desired characteristics. This procedure is found expeditious because of the difficulty of determining accurately extremely small amounts, amounting to residual traces, of endogenous activators.

The process of the invention is now further illustrated by examples included to show in detail the manner of practicing the invention. All parts are by weight unless otherwise specified.

EXAMPLE 1

The purification of lactams by heating with sulfuric acid, (e.g. U.S. Patent 2,828,308) may remove other impurities, but heating pyrrolidone with sulfuric acid leads to the formation of pyrrolinyl-pyrrolidone in pyrrolidone solution. Such solutions can be employed to provide activator to polymerization systems if desired.

A sufficient amount of concentrated sulfuric acid to provide about 2 percent by weight is added to a large batch of commercial pyrrolidone monomer in a vessel fitted to provide reflux conditions under reduced pressure. The mixture is heated under an atmosphere of nitrogen at ambient pressure for 3 hours at 150° C. and is then refluxed under reduced pressure at 156° C. for 18 hours. The mixture is thereafter fractionated, without neutralization, through a 9/16 inch by 11 inch column packed with ⅛ inch glass helices and the first ten percent is rejected as a forerun. The bulk (about 85%) is distilled as a water-white clear liquid at about 130° C. and 13 mm. Hg pressure and is substantially anhydrous pyrrolidone containing about 1.5% by weight of 1-(1-pyrrolin-2-yl)-pyrrolidinone as shown by analytical tests, as elsewhere described herein.

EXAMPLE 2

*Removal of pyrrolinyl-pyrrolidone from monomer*

To a portion of the pyrrolidone containing about 1.5% of pyrrolinyl-pyrrolidone is added 15 percent by weight of water and the mixture is heated at about 125° C. for 15 hours followed by 2 hours at about 155° C. Xylene is added (about 5–10 volume percent) and the mixture is distilled under about 60 mm. Hg pressure to remove excess water azeotropically and finally the remaining xylene is stripped off at up to about 90° C. The residual pyrrolidone is found to have a pH (in an about 1% aqueous solution) of about 5.5. Potentiometric titration, gas chromatography and polymerization tests all indicate the substantial removal of pyrrolinyl-pyrrolidone and other endogenous activators; the remaining activator concentration is of the order of 0.02 percent by weight.

To four portions (about 1500 ml. each) of the pyrrolidone containing about 1.5% of pyrrolinyl-pyrrolidone are added portions of 165 ml. (15% by volume) of water and each is then heated rapidly and maintained at a specific temperature for periods of about 18 to 24 hours. Aliquots are removed at intervals and titrated with standard hydrochloric acid to a brom-cresol green end point (pH 4.9) and the concentration of pyrrolinyl-pyrrolidone computed. Table 1 shows representative concentrations thus determined after reaching the respective temperatures, after 150 minutes and after about 18–24 hours, for portions held at each of four temperatures.

TABLE 1
[Pyrrolinyl-pyrrolidone concentrations (percent)]

| Sample | A | B | C | D |
|---|---|---|---|---|
| Temperature, °C | 105 | 115 | 125 | 135 |
| Time: | | | | |
| Initial [1] | 1.605 | 1.57 | 1.462 | 1.28 |
| 150 minutes | 1.062 | 0.758 | 0.325 | 0.11 |
| 18–24 hours | 0.022 | 0.022 | 0.016 | 0.011 |

[1] After reaching the indicated temperature.

It is apparent that the reaction proceeds more rapidly at elevated temperatures; in fact so rapidly that there are significant decreases in concentration of pyrrolinyl-pyrrolidone during the time required for heating to the higher temperatures.

It is found that when acids such as hydrochloric, perchloric and sulfuric are added in amounts to make the pyrrolidone from about 0.001 N to about 0.1 N in acid the hydrolysis is very much accelerated, the time required to reach the pyrrolinyl-pyrrolidone concentration indicated being reduced by a factor of about 10.

As pointed out by Ney et al. in United States Patent No. 2,638,463, substances containing active hydrogen atoms are inhibitors for the polymerization. There are many such substances which are known but those of most significance are substances such as water, ammonia, butanediol, butenediol, and pyrrole, which may be present as trace impurities. The concentrations of these at the time of polymerization apparently must be very low, or even vanishingly small. The removal of inhibitors is fairly readily effected by acidic treatments such as the addition of phosphorus pentoxide or heating with about 2 percent by weight of sulfuric acid. The latter, in particular, appears to destroy some of the inhibitors and/or other impurities by resinification and the pyrrolidone is then recovered by simple distillation under reduced pressure. This process does not, however, appear to reduce the concentration of activators inherently present in commercial pyrrolidone which usually amount to about 0.5 to 1.0 percent. In fact, such treatment increases the amount of pyrrolinyl pyrrolidone present as seen in Example 2 above.

EXAMPLE 3

Data derived from a series of experimental runs summarized hereinafter in Table 2 show the effects above described. In each case the monomer was purified using the procedure specified from the commercially obtained material (pH about 11, produced by the Reppe process) which was found by gas chromatography to be about 97% pyrrolidone and to contain numerous trace impurities. The several treatments are outlined below:

Lots A and B—Monomer dried by addition of about 15 parts of xylene followed by azeotropic distillation to remove water and stripping at about 34 mm. Hg and 51° C. to remove xylene.

Lot C—Monomer first refluxed for 3 hours with 17 parts of water and then distilled as for lots A and B.

Lot D—Monomer heated for 3 hours with 2% by weight of concentrated sulfuric acid, distilled from the acid under reduced pressure (130° C., 13 mm. Hg pressure) and then azeotropically distilled with xylene as in lot A.

Lot E—Same as lot D, then fractionated through a packed fractionating column (7–8 theoretical plates).

Lot F—Monomer heated 3 hours with 2% by weight of concentrated sulfuric acid, distilled from the acid at 130° C. and about 13 mm. Hg pressure, then 10 parts of water added and heated 2 hours at 160° C., thereafter dried by azeotropic distillation from xylene and then distilled at 130° C. and about 13 mm. Hg pressure.

Lot G—Same treatment as lot E, then heated at 160° C. with 10 parts by weight of water for 2 hours and dried as for lot A.

For evaluation of the quality of the monomer for polymerization, 100 parts of each monomer is employed for a polymerization run, using phenyl isocyanate as an activator and sodium pyrrolidone as the catalyst. The activator is added in the parts by weight indicated. The catalyst is added in amount of about 3–4 mole percent, e.g. by the addition of an alkali metal or the dry alkali metal salt of pyrrolidone, in the usual way. Following polymerization at the time and temperature shown, the products are worked up by breaking up in a grinder followed by washing 3 times with distilled water, followed by washing once with methanol and drying to 104° C. under atmospheric conditions for 4 hours. Inherent viscosities are determined by usual procedures at a concentration of about 0.2 g. per deciliter in meta-cresol avoiding prolonged heating so far as possible.

A sample of commercial pyrrolidone which is fractionated using seven theoretical plates, heating with about 10 percent of water for about 2 hours at 160° C., dried by azeotropic distillation with xylene and finally distilled under reduced pressure (130° C. at about 13 mm. Hg pressure) is found to give 5.6 percent conversion, 1.41 inherent viscosity, after 24 hours at 50° C., when no activator is added to the polymerization mixture. The monomer number is 1.41, indicating substantially complete removal of endogenous activators.

TABLE 2

| Lot | Activator (percent) | Yield (percent) | Inherent viscosity | Time (hrs.) |
|---|---|---|---|---|
| A | 0.42 | 61 | 0.98 | 36 |
| B | 0.21 | 42 | 0.98 | 36 |
| C | 0.42 | 68 | 1.36 | 90 |
| D | 0.42 | 75 | 0.9 | 24 |
| E | 0.42 | 76 | 1.16 | 84 |
| F | 0.08 | 65 | 2.0 | 187 |
| G | 0.21 | 41 | 2.34 | 44 |

Lot D is illustrative of polymerization with too much activator in which high conversion, but low molecular weight, are obtained in a relatively short time.

Lots A and B show the effect of decreasing the activator concentration but it is evident that the decrease in added activator amount plus any decrease due to the treatment of monomer in lot B is still insufficient to give a polymer of high average molecular weight even with a longer time of polymerization.

Lot C, comparable with lot A in amount of added activator, shows the effect of removal of pyrrolinyl-pyrrolidone by the process of the invention in the improvement of molecular weight range. There is evidently still endogenous activator (butyrolactone) remaining in the monomer since this was not removed by fractionation.

Lot E shows the results of polymerization after a process in which fractional distillation removes butyrolactone from the monomer but the excessive heating during distillation apparently forms an amount of pyrrolinyl-pyrrolidone almost equivalent to the removed butyrolactone since the inherent viscosity of the polymer produced is only slightly better than lot D.

Lot G shows the highly beneficial effects when the water treatment of the process of the invention is combined with fractionation. The purified pyrrolidone in this case has a pH of 7.0 in 50% aqueous solution and is substantially neutral.

EXAMPLE 4

Commercial pyrrolidone having low specific butyrolactone content is found upon analysis to contain about 0.04% butyrolactone, 0.05% water and 0.225 percent pyrrolinyl-pyrrolidone. A mixture of 1500 parts of this commercial pyrrolidone and 82.5 parts of water (4.67 wt. percent) is heated at 150° C. under reflux for 10.5 hours with mechanical stirring. At the end of the heating period the mixture is cooled, 250 parts of xylene is added and the azeotrope of xylene and water is removed, excess xylene is distilled and about 2-3% of the pyrrolidone is taken over as a forerun. About 1350 parts of pyrrolidone are recovered by distilling rapidly at 120° to 125° C. under reduced pressure. About 75 parts of rather dark-colored residue remains.

A sample (25 ml.) of the purified pyrrolidone is diluted with 150 ml. of distilled water and titrated potentiometrically against 0.2 N hydrochloric acid using a glass electrode, and plotting the results graphically, pH vs. volume of acid. The volume difference associated with the second inflection is considered to be due to neutralization of the pyrrolinyl-pyrrolidone. A first inflection point is apparently always present and is believed to be due to very small amounts (on a weight basis) of ammonia. It is found that this purified monomer contains about 0.04 percent of pyrrolinyl-pyrrolidone.

Heating for about 5 hours at 150° C., the remainder of the procedure being the same, gives essentially similar results.

The monomer number is determined by adding about 4 parts of crystalline anhydrous sodium pyrrolidone to 100 parts of the purified monomer and permitting the solution to stand with rigorous exclusion of water vapor at 50° C. for 93 hours. Weighings and manipulation are carried out in a conventional dry box or chamber. At the end of this period the reaction mixture is quenched in water and the polymer collected, pulverized, washed thoroughly with water, very dilute aqueous acid, and dried. There is 11.7% conversion and the polymer has an inherent viscosity of 1.45. The monomer number is thus 1.094.

The commercial pyrrolidone employed in this example is found by the same procedure to polymerize to 35.4% conversion with 1.79 inherent viscosity in only 24 hours after drying by azeotropic distillation with xylene, and the polymerization was stopped for determination of the monomer number as above. (In 93 hours the polymerization would have gone so far that the rate would be levelling off, thus giving an erroneous value.) The monomer number is 0.71.

A portion of the commercial pyrrolidone purified by the process of this example is catalyzed as in the above described test procedure, and with the addition of 0.152 part of butyrolactone as an activator. In 93 hours the polymerization proceeds to 31.2% conversion and the polymer has an inherent viscosity of 2.39.

What is claimed is:

1. The process for hydrolyzing 1-(1-pyrrolin-2-yl)-2-pyrrolidinone in 2-pyrrolidone containing the same to give 2-pyrrolidone which comprises the step of heating said 2-pyrrolidone containing 1-(1-pyrrolin-2-yl)-2-pyrrolidinone with from about 3 to about 25 percent by weight of water at a temperature in the range of from about 80° to 200° C. for a period ranging from about 15 minutes up to about 16 hours, longer periods being employed with lower temperatures and shorter periods with more elevated temperatures.

2. The process for hydrolyzing 1-(1-pyrrolin-2-yl)-2-pyrrolidinone in pyrrolidone containing same to give pyrrolidone free from 1-(1-pyrrolin-2-yl)-2-pyrrolidinone and having a monomer number from 1 to 2 and comprising the steps of:
   (A) adding from about 3 to 25 percent by weight of water to pyrrolidone free from butyrolactone and inhibitors for the polymerization of pyrrolidone;
   (B) heating the pyrrolidone containing water to a temperature in the range of about 80° to 200° C. for a period of about 15 minutes to 16 hours, a longer period being employed with a lower temperature and a shorter period with a more elevated temperature; and
   (C) thereafter adding a water-azeotroping solvent, rapidly distilling off the water and azeotroping solvent under reduced pressure until the 2-pyrrolidone is anhydrous and thereafter distilling the latter rapidly under reduced pressure and at a temperature below about 130° C.

References Cited in the file of this patent
UNITED STATES PATENTS
3,040,004    Glickman et al. _____ June 19, 1962

UNITED STATES PATENT OFFICE
CERTIFICATE OF CORRECTION

Patent No. 3,184,476                                  May 18, 1965

Harold T. Wingfield et al.

It is hereby certified that error appears in the above numbered patent requiring correction and that the said Letters Patent should read as corrected below.

Column 2, line 11, before "number", first occurrence, insert -- monomer --; line 24, for "imurity" read -- impurity --; line 31, for "jurification" read -- purification --; column 6, line 25, for "2,828,308" read -- 2,828,307 --; column 8, line 67, for "specific" read -- specified --.

Signed and sealed this 12th day of October 1965.

(SEAL)
Attest:

ERNEST W. SWIDER                                   EDWARD J. BRENNER
Attesting Officer                                         Commissioner of Patents